May 5, 1936.  J. C. McCUNE  2,039,733
ELECTROPNEUMATIC BRAKE
Filed May 6, 1933  4 Sheets-Sheet 1

*INVENTOR.*
JOSEPH C. McCUNE
By *Wm. M. Cady*
*ATTORNEY.*

May 5, 1936.  J. C. McCUNE  2,039,733
ELECTROPNEUMATIC BRAKE
Filed May 6, 1933   4 Sheets-Sheet 4

INVENTOR.
JOSEPH C. McCUNE
By *Wm. M. Cady*
ATTORNEY.

Patented May 5, 1936

2,039,733

UNITED STATES PATENT OFFICE 2,039,733

ELECTROPNEUMATIC BRAKE

Joseph C. McCune, Edgewood, Pa., assignor to The Westinghouse Air Brake Company, Wilmerding, Pa., a corporation of Pennsylvania Application May 6, 1933, Serial No. 669,746

36 Claims. (Cl. 303—15)

This invention relates to electro-pneumatic brake equipment and particularly to fluid actuated train brake equipment that may be controlled pneumatically in the usual manner and electrically.

An object of the invention is to provide an electro-pneumatic brake equipment, wherein a single electro-magnet valve device having two operative positions serves to so control an electrical triple valve, that by simply energizing and deenergizing the magnet in a proper sequence of operation and for regulated periods of time, the electrical triple valve may be moved as desired to the usual operating positions for effecting the usual operation of the brakes, such as service application, graduated service application, release, and graduated release of the brakes, as well as a lap position wherein the brakes are retained applied.

A further object of the invention is to provide an electrical control system for pneumatic brake equipment having the above noted characteristics, wherein the electro-magnet valve device is controlled by a two wire or conductor electrical circuit.

A further object of the invention is to provide an improved electrically controlled triple valve device for controlling the pneumatically actuated brake equipment, and an improved and simplified electrical brake switch device for controlling the operation of said electrically controlled triple valve device.

These and other objects of the invention that will be made apparent throughout the further description thereof, are attained by means of the apparatus hereinafter described and illustrated in the accompanying drawings; wherein.

Figure 1:
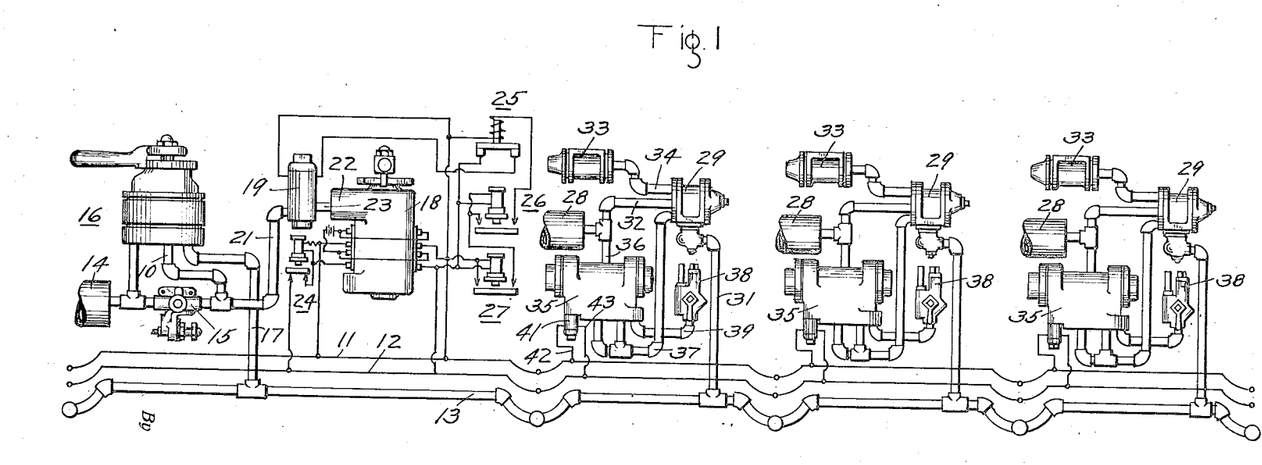
Fig. 1 is a diagrammatic view of an electropneumatic brake equipment embodying features of my invention.

Referring to the drawings, the brake equipment includes the train conductors 11 and 12 and the usual brake pipe 13, all of which extend throughout the length of the train. On the locomotive are mounted the usual main reservoir 14 and associated feed valve device 15, brake valve device 16, and branch pipe 17 for connecting the brake valve device 16 to the brake pipe 13. Also carried upon the locomotive is an improved electrical brake switch device 18, and associated therewith is an electro-magnet valve device 19, that is connected to the brake valve device 16 by a branch pipe 21 and to an interlocking device 22 on the brake switch 18 by a pipe 23. Also associated with the brake switch device 18 are two relay switch devices 24 and 25, the latter controlling the current supplied from the train conductors 11 and 12 to the electro-magnet valve device 19, and two series related, delayed action relay devices 26 and 27 for controlling certain functions of the brake switch device 18.

Upon each car of the train, including the caboose, are mounted an auxiliary reservoir 28, a pneumatically controlled triple valve device 29 connected to the brake pipe by a branch pipe 31 and to the auxiliary reservoir by a pipe 32, a brake cylinder 33 connected to the triple valve device 29 by a pipe 34, and an electrically controlled triple valve device 35 that is connected to the auxiliary reservoir by a pipe 36 and to the exhaust port of the triple valve device 29 by a pipe 37, the electrical triple valve device 35 being provided with the usual retainer valve device 38 to which it is connected by a pipe 39. As will hereinafter appear, each electrically controlled triple valve device 35 is provided with a magnet valve device 41, the winding of which is connected across the train conductors 11 and 12 by branch conductors 42 and 43, respectively.

The electrical brake switch device 18 and appurtenant devices are shown in detail in Figs. 2 to 7 and comprise a metal casing 51 containing a rotary switch drum 52 made of insulating material which is mounted on a metal operating shaft 53 that is journaled for rotation in the end walls 54 and 55 of the casing 51, the shaft extending through the latter end wall exteriorly of the casing and being provided with an operating handle 56 that is movable to three operative positions, namely, a central or lap position, a right or service position, and a left or release position. If the operating handle 56 is moved from service position to lap position, it is said to be in service-lap position, and if it is moved from release position only as far as lap position, it is said to be in running-lap or release-lap position.

Figures 2, 3, 4, 5, 6, 7:
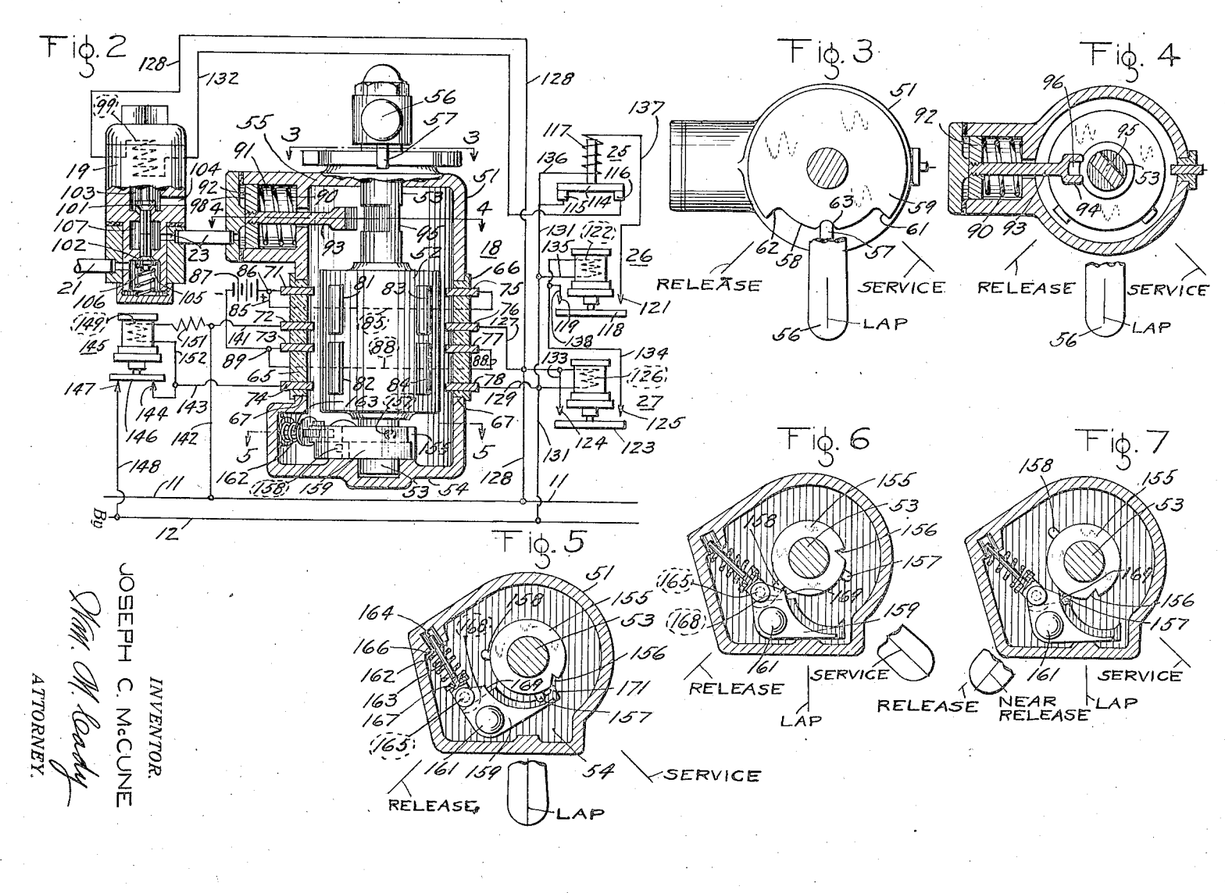
Fig. 2 is a diagrammatic view, mainly in section, of an improved electrical brake switch device for controlling the electro-pneumatic brake equipment shown in Fig. 1.
Fig. 3 is a plan view, partially in section, of the brake switch device shown in Fig. 2.
Fig 4 is a transverse section through the brake switch device taken on the line 4—4 of Fig. 2.
Figs. 5, 6, and 7 are transverse sections through the brake switch taken on the line 5—5 of Fig. 2, showing the switch operating handle and shaft in different operative positions, respectively.

The operating handle 56 is provided with a spring-pressed movable stop pin 57, Figs. 2 and 3, that is yieldingly pressed into engagement with the bottom edge of a notch 58 in the periphery of a stop disc 59 that is secured to the casing 51. The bottom edge of the notch is provided midway between the stop shoulders 61 and 62 on the disc, with a notch 63 for receiving the stop pin 57 for yieldingly retaining the operating handle 56 and its associated shaft 53 and switch 52 in lap position. The handle and switch drum are arrested in service and release position by engagement of the stop pin 57 with the stop shoulders 61 and 62, respectively.

Insulating plates 65 and 66 are secured in and close openings 67 in the wall of the casing 51, the plate 65 being provided with conductive contacts 71, 72, 73 and 74 and the plate 66 being provided with conductive contacts 75, 76, 77 and 78.

As shown in Fig. 2, the switch drum 52 is in central or lap position and on its left side is provided with two switch contacts 81 and 82, the former being adapted to engage and conductively connect the contacts 71 and 72, and the latter being adapted to engage and conductively connect the contacts 73 and 74, when the drum 52 is in release position.

The drum is provided on its right side with two bridging switch members 83 and 84, the former being adapted to engage and conductively connect contacts 75 and 76 and the latter being adapted to engage and conductively connect contacts 77 and 78 when the drum 52 is in service position.

The contacts 71 and 75 are conductively connected by a conductor 85 which is connected to the positive pole terminal 86 of a battery 87, or other source of direct current, which supplies current to the electrical control circuit including the train conductors 11 and 12, and contacts 73 and 77 are conductively connected by a conductor 88 that is connected to the negative terminal 89 of said battery 87.

As hereinafter appears and for reasons that will subsequently be made apparent, the train conductors 11 and 12 are connected to the battery or direct current source when the brake switch device is in service position and interlocking means prevents the movement of the operating handle from service position for a predetermined time after movement thereof to service position. The train conductors 11 and 12 are also connected to the battery or source of direct current for a predetermined time when the operating handle 56 and switch drum 52 are in release position, and are disconnected from said source of current after the said predetermined time has expired. The train conductors are disconnected from the source of power when the brake switch device is in lap position.

The switch drum 52 of the brake switch device 18 is retained in service position for a predetermined time after movement into service position, by an electrically controlled interlocking device which comprises a chamber 91 in the casing 51, which contains an operating piston 92 connected to a forked rod 93 having spaced prongs 94, Fig. 4, which are adapted to straddle a flattened portion 95 of the shaft 53. When the operating handle 56 is in service position, the shaft 53 is turned so that the flattened portion 95 of the shaft is aligned with the notch 96 between the prongs 94, at which time the rod 93 may be moved to cause the prongs 94 to engage the flat portion 95 of the shaft 53 and prevent rotation of the shaft until the forked rod 93 is withdrawn to the position shown in Figs. 2 and 4. A spring 90 acting on the piston 92, serves to normally yieldingly retain the forked rod in retracted position.

The piston 92 is actuated for moving the forked rod 93 into locking engagement with the shaft 53, by fluid under pressure supplied to the chamber 98 at the left face of the piston, from the feed valve device 15 through pipe 21, the magnet valve device 19 and the pipe 23.

The magnet valve device 19 comprises a winding 99 for operating oppositely seating valves 101 and 102, the valve 101 being contained in a chamber 103 which is open to the atmosphere through an atmospheric passage 104 and the valve 102 being contained in a chamber 105 to which the pipe 21 leading from the feed valve device 15 is connected. Also contained in the chamber 105 is a helical spring 106, the pressure of which tends to seat valve 102 and unseat valve 101.

Intermediate the valves 101 and 102 there is a chamber 107 which is connected through passage and pipe 23 to chamber 98 at the left face of the piston 92.

When the winding 99 is energized, as when the brake switch device is in service position, valve 101 is seated and valve 102 is unseated. Fluid under pressure is then supplied from the feed valve device 15 to the chamber 98 at the left face of the piston 92 through pipe 21, chamber 105, past the unseated valve 102, chamber 107, and passage and pipe 23. The fluid under pressure acting on the left face of the piston 92, overcomes the pressure of the spring 91 and forces the forked rod 93 into locking engagement with the flattened portion 95 of the shaft 53, which prevents rotation of the shaft 53 so long as the rod 93 is held in locking position.

The winding 99 of magnet valve device 19 is energized only when the brake switch handle 56 and switch drum 52 are in service position, where it is held for a predetermined time, depending upon the operation of delayed action relay devices controlled by said switch drum, which cause deenergization of the magnet valve device 19 and release of the locking rod 93 from engagement with the shaft 53.

Associated with the brake switch device 18 are a normally closed relay switch device 25 and two delayed action relay switch devices 26 and 27. The relay switch device 25 comprises a bridging switch member 114 for conductively connecting contacts 115 and 116 and which is normally retained in closed position by gravity or by a spring, not shown. The bridging switch member is moved to open position out of engagement with said contacts when a winding 117 of the relay device is energized.

The delayed action relay switch devices 26 and 27 are of the time delay type, the device 26 having a bridging switch member 118 for conductively engaging contacts 119 and 121 and which is normally held in open position out of engagement with said contacts by gravity or by a spring, not shown.

The bridging switch member 118 is moved to closed position when the winding 122 thereof is energized for a predetermined time, depending upon the inductive impedance of the winding, which may be proportioned to suit operating conditions, and serves to delay movement of the switch member 118 to closed position until a predetermined time has elapsed after energization of the operating winding 122.

The relay device 27 is similar to the relay device 26 and comprises a bridging switch member 123 for conductively engaging contacts 124 and 125, the said switch member being normally in open position and adapted to be closed, in the manner of the relay switch device 26, a predetermined time after its operating winding 126 is energized.

When the switch drum is moved to service position, bridging switch member 83 on the drum conductively engages contacts 75 and 76 and bridging switch member 84 on the drum conductively engages contacts 77 and 78. The flattened portion 95 on the shaft 53 is then aligned with the notch 96 in the forked rod. The train wires 11 and 12 are connected to the source of direct current or the battery 87, the positive terminal 86 thereof being connected to the train wire 11 through conductor 85, contact 75, bridging switch member 83, contact 76, conductors 127 and 128, and the negative terminal 89 of the battery being connected to the train wire 12 through conductor 88, contact 77, bridging switch member 84, contact 78, and conductors 129 and 131.

The winding 99 of the magnet valve device 19 is then connected across the energized conductors 11 and 12 through conductor 128, winding 99, conductor 132, contact 116 of the relay switch device 25, bridging switch member 114, contact 115 and conductor 131.

As before stated, energization of the winding 99, causes fluid under pressure to be supplied to chamber 98 and the piston 92 forces the forked rod 93 into locking engagement with the shaft 53. The shaft 53 remains locked in service position so long as the winding 99 is energized, or until the circuit through the winding is interrupted by movement of the bridging switch member 114 to open position. The operation of the bridging switch member 114 is controlled by the delayed action relay devices 26 and 27, which function in the following manner.

At the moment the train conductors 11 and 12 are energized, the winding 126 of the relay switch device 27 is energized through conductors 128 and 127, winding 126, conductors 129 and 131. After a predetermined time delay, due to the impedance of the winding of the relay device, the bridging switch member 123 engages contacts 124 and 125 and thereby connects the winding 122 of the relay switch device 26 across the then energized train conductors 11 and 12, through conductors 128 and 127, conductor 133, contact 124, bridging switch member 123, contact 125, conductor 134, winding 122, and conductors 135 and 131.

Energization of the winding 122 causes the bridging switch member 118 to move to closed position in engagement with contacts 119 and 121, a predetermined time after the winding 122 is energized, due to the impedance of the winding of the relay switch device 26.

Closure of the bridging switch member 118 connects the winding 117 of the relay switch device 25 across the then energized conductors 11 and 12, and the winding is energized through conductors 128, 127, and 133, contact 124, closed bridging switch member 123, contact 125, conductors 134 and 138, contact 119, closed bridging switch member 118, contact 121, conductor 137, winding 117, and conductors 136 and 131.

Energization of winding 117 causes the bridging switch member 114 to move to open position and interrupt the circuit through the winding 99 of the magnet valve device 19.

Deenergization of the magnet valve device 19 permits the spring 106 thereof to seat the valve 102 and unseat the valve 101. With the valve 102 seated, the flow of fluid from the feed valve device 15 to the chamber 98 at the left of the piston 92 is cut off, and with the valve 101 unseated, communication is established from the chamber 98 to the atmosphere through pipe and passage 23, chamber 107, past the open valve 101, chamber 103 and atmospheric passage 104.

Fluid under pressure may then flow to atmosphere from the chamber 98 and the consequent reduction in fluid pressure permits the spring 90 to force the piston to its left position and to withdraw the forked rod 93 from the shaft 53, thereby releasing the shaft for subsequent rotation toward lap or release position.

Thus, it is apparent that when the shaft 53 of the brake switch device is moved to service position, it is first locked in that position for a predetermined time determined by the operation of the delayed action relay switch devices 26 and 27, after which time the shaft may be rotated as desired. The purpose of this feature of the operation of the brake switch device will hereinafter appear.

When the operating handle 56 and switch drum 52 are in lap position, as shown in Figs. 2 and 3, the bridging switch members 81, 82, 83, and 84 are out of engagement with their respective contacts and the train conductors 11 and 12 are, therefore, disconnected from the battery 87 or source of direct current.

Upon movement of the operating handle 53 and switch drum 52 to release position, the bridging switch member 81 engages contacts 71 and 72 and the bridging switch member 82 engages the contacts 73 and 74. The battery 87 is then connected to the train conductors 11 and 12, the positive terminal 86 of the battery being connected to the conductor 11 through the contact 71, bridging switch member 81, contact 72, conductors 141 and 142, and the negative terminal 89 being connected to the train conductor 12 through contact 73, bridging switch member 82, contact 74, conductor 143, contact 144 of a normally closed delayed action relay switch device 145, the bridging switch member 146 of said relay device, contact 147 and conductor 148.

Upon movement of the operating handle 56 and switch drum 52 to release position, the winding 149 of the delayed action relay device 145 is connected across the battery 87, through positive terminal 86, contact 71, bridging switch member 81, contact 72, conductor 141, resistance 151, winding 149, conductors 152 and 143, contact 74, bridging switch member 82, contact 73 and negative terminal 89.

The impedance of the winding 149 of the delayed action relay device 145 is so proportioned that it will delay opening movement of the normally closed bridging switch member 146 for a predetermined time after the winding 149 has been energized.

From the foregoing, it is apparent that upon movement of the operating handle 56 and switch drum 52 to release position, the train conductors 11 and 12 will be energized for a predetermined time, depending on the functioning of the delayed action relay switch device 145.

For reasons that will hereinafter appear, provision is made in the brake switch device 18 in the form of an interlock mechanism, to prevent movement of the operating handle 56 and switch drum 52 from release-lap position to release position without first moving the operating handle 56 and the switch drum 52 to service position. The interlocking mechanism employed is shown in Figs. 5, 6, and 7 and is somewhat similar to the interlock mechanism disclosed in U. S. Patent 1,810,547, issued June 16, 1931 to John H. Farmer.

Referring to Figs. 5, 6, and 7, the interlock mechanism comprises a collar 155 fixed to the lower end of the shaft 53 and disposed within the casing 51, the said collar having a notch 156 in the peripheral edge thereof and two radially extending pins 157 and 158 which are fixed thereto.

A dog member 159 is mounted within the casing 51 for oscillation about a pivot shaft 161 fixed to the end wall 54 of the casing 51. An over-center spring device serves to move the dog member to either of its two operative positions, as shown in Figs. 5 and 6, and yieldingly retains it in such a position until forced out of such position by the pins 157 and 158 fixed to the collar 155, in the manner to be described.

The over-center spring device comprises a helical spring 162 surrounding a spring retainer rod 163 having one end mounted in a recess 164 in the casing 51 for longitudinal and angular movement, and its other end pivotally connected to said dog member 159 by a pivot pin 165. The spring engages a seat 166 on the casing 51 and a shoulder 167 on the retainer rod 163.

As shown in Fig. 7, the operating handle is almost in release position and the pin 157 is engaging the shoulder 169. Final movement of the operating handle to release position will rotate the dog member counter-clockwise and it will be forced to the position shown in Fig. 5. The operating shaft 53 may then be turned counter-clockwise to service position, shown in Fig. 6, wherein it is locked and retained for a predetermined time by the forked interlock rod 93, Fig. 4, in the manner previously described.

During the movement of the shaft 53 from release position to service position, and as the operating shaft approaches service position, the pin 158 engages the shoulder 168 on the dog member and rotates it in a clockwise direction against the action of the spring 162. However, after the pivot pin 165 has been moved above a center line through the recess 164 and pivot shaft 161, the spring expands and forces the dog member 159 to retracted position, as shown in Fig. 6.

Upon release of the shaft 53 by withdrawal of the interlocking forked rod 93, the shaft 53 may be turned to lap position or to release position without interference. As the shaft 53 approaches release position, the pin 157 engages the shoulder 169 on the dog member 159 and rotates the latter counter-clockwise against the action of the spring 162, until the pivot pin 165 passes below the said center line, at which time the spring expands and forces the dog member 159 to the position shown in Fig. 5, wherein the finger 171 on the dog member engages the peripheral edge of the collar 155.

Should the operating handle 56 and shaft 53 be moved to release-lap position from release position and an attempt be made to move the handle and shaft to release position without first moving it to service position, the finger 171 engages in the notch 156 in the collar 155 and prevents such movement. In order to move the operating handle to release position from release-lap position, that is, after it has previously been moved directly to lap position from release position without going through service position, it is necessary to first turn the shaft 53 to service position, thereby causing the dog member 159 to be moved to retracted position in the manner described.

The purpose of this feature of operation of the operating handle of the brake switch device 18 will hereinafter appear.

Figure 8:
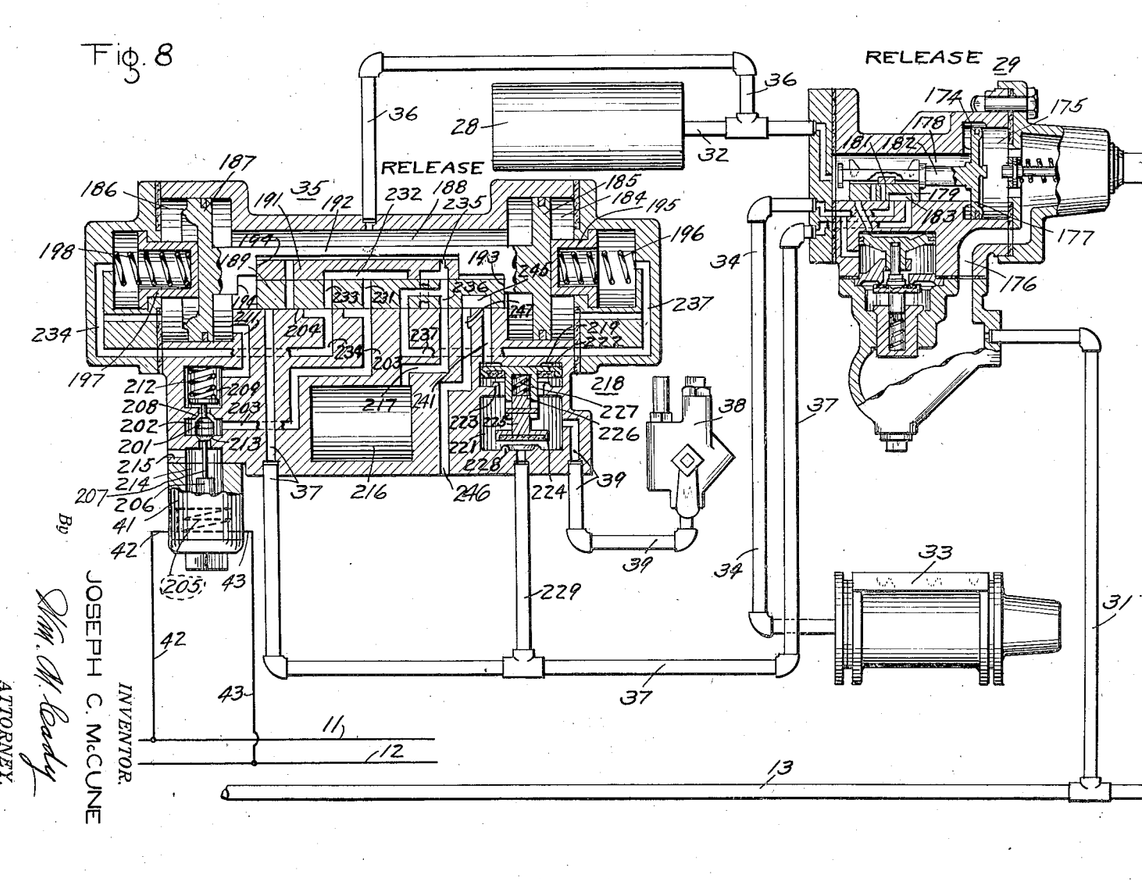
Fig. 8 is a diagrammatic view, mainly in section, of the electrically controlled triple valve device embodying features of the invention, and the usual pneumatically controlled triple valve device associated therewith, the parts being shown in the positions occupied thereby when the brake switch is in release position.

Referring now to the brake equipment on the cars and caboose of the train, as shown in Figs. 1 and 8, the pneumatic triple valve device 29 comprises a casing having a piston chamber 175, connected to the brake pipe 13 through the dirt cleaner passage 176 and branch pipe 31, and containing a piston 177, and having a valve chamber 178, connected to the auxiliary reservoir 28 by a passage and pipe 32, and containing a main slide valve 179 and an auxiliary or graduating slide valve 181 mounted on and having movement relative to the main slide valve, said valves being operated by the piston through a piston stem 182.

The pneumatic triple valve device is of a well known standard construction and the parts normally are in the release or running position, as shown in Fig. 8, when the brake equipment is being controlled by the electrical control equipment.

With the main slide valve of the pneumatic triple valve device in release or running position, as shown in Fig. 8, the cavity 183 therein serves to establish communication between the passage and pipe 34 connected to the brake cylinder 33 and the pneumatic triple valve exhaust passage and pipe 37, to be more fully herein described.

The pneumatic triple valve device is responsive to variations in brake pipe pressure for effecting the usual control of the brake equipment pneumatically and, therefore, may be controlled in the usual manner by the brake valve device 16 on the locomotive.

The electrically controlled triple valve device 35, hereinafter called the electrical triple valve device, comprises a casing having a piston chamber 184 containing a piston 185, and a piston chamber 186 containing a piston 187, and having a valve chamber 188 intermediate said piston chambers connected to the auxiliary reservoir 28 by a pipe 36, and containing a main slide valve 189 and an auxiliary or graduating slide valve 191 mounted on and having movement relative to the main slide valve, said valve being operated by the pistons 185 and 187 through a stem 192 integrally connecting said pistons.

The main slide valve 189 is disposed between stop shoulders 193 and 194 on the stem 192, so spaced that the stem may be moved relatively with respect to the main slide valve. The graduating slide valve 191 is so connected to the stem 192 that it moves with it and may lap and uncover ports in the main slide valve, as will hereinafter appear.

Within the piston chamber 184, a centering or stop device is mounted comprising a slidably mounted stop member 195 and a spring 196 for yieldingly biasing said stop member toward its extreme left position.

A similar centering or stop device is mounted within the piston chamber 186 and comprises a slidably mounted stop member 197 and a spring 198 for yieldingly biasing said stop member toward its extreme right position. When the stop members 195 and 197 are in their extreme left and right positions, respectively, they respectively engage the pistons 185 and 187 and yieldingly retain them in central or release position.

The electrical triple valve device 35 is provided with a magnet valve device 41 for controlling the operation of the pistons 185 and 187 and their associated slide valves, and which comprises an oppositely seating valve 201 having opposite valve faces and disposed within a chamber 202 having a passage 203 leading to the seat 204 for the main slide valve. A magnet winding 205 surrounding an armature 206 on the valve stem 207, when energized, causes the valve 201 to engage a seat 208 and close communication between the chamber 202 and a chamber 209 within the casing of the electrical triple valve device having a passage 211 open to the valve chamber 188.

A spring 212 within the chamber 209 normally presses the valve 201 into engagement with a valve seat 213, as shown in Fig. 8, thus closing communication between the chamber 202 and a chamber 214 that is open to the atmosphere through atmospheric port 215.

The winding 205 of the magnet valve device 41 is connected across the train conductors 11 and 12 by conductors 42 and 43 and is energized when the train conductors are energized.

A volume reservoir 216 is provided in the electrical triple valve device casing and a passage 217 leads therefrom to the seat 204 for the main slide valve.

The electrical triple valve device 35 is also provided with a triple valve exhaust closing valve device 218 comprising valve chambers 219 and 221 in the casing of the electrical triple valve device, the chamber 219 containing a valve piston 222 for making sealing engagement with an annular seat rib 223 for closing communication between chambers 219 and 221, and the chamber 221 containing a valve 224 yieldingly connected to the valve piston 222 by a stem 225, telescoping within a stem 226 and having a slot and pin lost motion connection thereto. The spring 227 within the stem 226 yieldingly holds the stem 225 in extended position with respect to the valve piston 222, as shown in Fig. 8. The valve 224 is adapted to seat upon an annular seat rib 228 and close communication from the exhaust pipe 37 and branch pipe 229 to the chamber 221. The retainer valve device 38 is connected to the chamber 221 by passage and pipe 39.

In charging the brake equipment above defined, fluid under pressure is supplied from the main reservoir 14, Fig. 1, through the feed valve device 15 and pipe 21, to the chamber 105 of the magnet valve device 19 of the brake switch device 18.

Fluid under pressure also flows from the feed valve device 15 to the brake valve device 16 through pipe 10 and thence to the brake pipe 13 through branch pipe 17. Fluid under pressure flows from the brake pipe 13 to the triple valve device 29 on each car and the caboose through branch pipes 31, and with the triple valve device in running position, as shown in Fig. 8, passes in the usual manner through the dirt collector passage 176 to the piston chamber 175 and thence around the piston 177 through feed groove 174 to the valve chamber 178. Fluid under pressure flows from the valve chamber to the auxiliary reservoir 28 through passage and pipe 32, and from pipe 32 to the valve chamber 188 of the electrical triple valve device 35 through pipe 36.

With the electrical triple valve device in release or running position and the magnet valve device deenergized, as shown in Fig. 8, fluid under pressure flows from the valve chamber 188 to the piston chamber 186 through passage 211, chamber 209, past the open valve seat 208, chamber 202, passage 203, port 231 in the main slide valve 189, cavity 232 in the graduating valve 191, port 233 in the main slide valve and passage 234.

Also fluid under pressure flows from the valve chamber 188 to the piston chamber 184, through restricted port 235 in the graduating valve 191, port 236 in the main slide valve 189 and passage 237. Fluid under pressure also flows from the port 236 in the main slide valve to the volume reservoir 216 through passage 217.

The pistons 185 and 187 are of equal area and since the outer and inner faces of both pistons are subjected to valve chamber or auxiliary reservoir pressure, the fluid pressure acting on said pistons is balanced and the stop members 195 and 197 then center the pistons in release position, as shown in Fig. 8.

The brake cylinder 33 is then open to atmosphere through pipe and passage 34, cavity 183 in the slide valve 179 of the pneumatic triple valve device 29, passage and pipe 37, pipe 229, past the open valve 224, chamber 221, passage and pipe 39 and retainer valve device 38.

With the brake valve 16 on the locomotive so positioned that the brake equipment is under control of the electrical control equipment, and with the pneumatic triple valve device in the running position, shown in Fig. 8, and with the brake switch device 18 in the running-lap or release-lap position, to which position it has been moved directly from release position without going through service position, wherein the magnet valve device 41 is deenergized, and with the electrical triple valve device 35 in release position, and with the brake cylinder open to the atmosphere through the retainer valve device, the operation of the brake equipment through the electrical control equipment is as follows:

To effect a service application of the brakes, the brake switch handle 56 is turned counterclockwise from release-lap position to service position, thereby causing energization of the train conductors 11 and 12 and consequent energization of the magnet valve devices in the manner above described. Energization of the magnet valve device 19 causes the operating shaft of the brake switch device to lock the shaft 53 in service position for a predetermined time and prevent immediate return of the handle to lap or to release position. It will be understood that while the brake equipment is being controlled by the electrical control equipment, the valves of the pneumatic triple valve device 29 remain in running or release position.

Energization of the magnet valve device 41 causes the valve 201 to close the seat 208 and open the seat 213, thus opening communication from the chamber 186 on the left face of the piston 187 to the atmosphere through passage 234, port 233 in the main slide valve 189, cavity 232 in the graduating slide valve 191, port 231 in the main slide valve, passage 203, chamber 202, past the open valve seat 213, chamber 214 and atmospheric passage 215. The higher fluid pressure in the chamber 184 then acting on the right face of piston 185 forces the pistons and valves to their extreme left or service position, as shown in Fig. 9.

Figure 9:
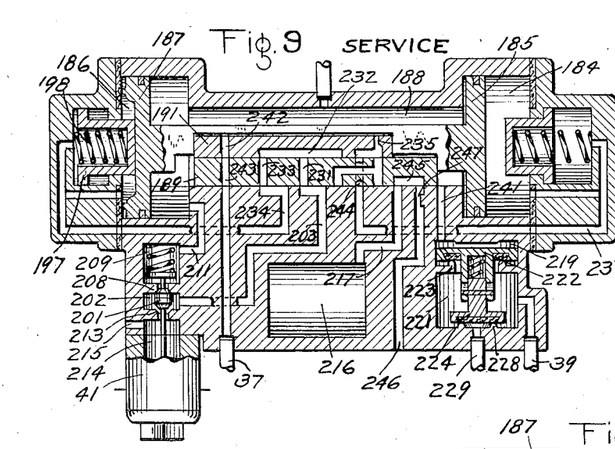
Figs. 9, 10, and 11 are diagrammatic sectional views of the electrically controlled triple valve device, showing the parts of the valve device in service, lap, and transition positions, respectively.

With the main and graduating slide valve in service position, as shown in Fig. 9, fluid under pressure flows from the valve chamber 188 to the piston chamber 219 of the triple valve exhaust closing valve device 218, through passage 241 and forces the valve piston 222 into engagement with the seat rib 223, and at the same time forces the valve 224 into engagement with the seat rib 228, thereby closing communication from the brake cylinder to the atmosphere. With the main slide valve 189 and the graduating valve 191 in service position, fluid at auxiliary reservoir pressure flows from the valve chamber 188 to the brake cylinder 33 through port 242 in the graduating slide valve 191, port 243 in the main slide valve 189, passage and pipe 37, cavity 183 in the main slide valve 179 of the pneumatic triple valve device 29, and passage and pipe 34. The amount of the brake cylinder pressure developed will be determined by the time the brake switch device is held in service position, the maximum pressure being the pressure of equalization between the auxiliary reservoir and the brake cylinder at the time of the movement of the brake switch device to service position, supplemented to a certain extent by restricted flow of fluid under pressure from the brake pipe through the feed groove 174 past the piston 177 of the pneumatic triple valve device 29.

With the valves of the electrical triple valve device in service position, communication from the piston chamber 186 to the atmosphere is maintained through the cavity 232 and ports 233 and 231 in the slide valves, and communication from the valve chamber 188 to the piston chamber 184 is also maintained through the restricted port and cavity 235 and port 244 in the slide valves and passage 237. The volume reservoir 216 is then open to the atmosphere through passage 217, cavity 245 and passage 246 having a restricted passage 247. When a full service brake application is not desired, the brake switch operating handle 56 is returned to service-lap position when the desired brake cylinder pressure has been attained, this movement being permitted by the previous retraction of the forked rod 93 from engagement with the brake switch operating shaft 53, in the manner previously described.

Figure 10:
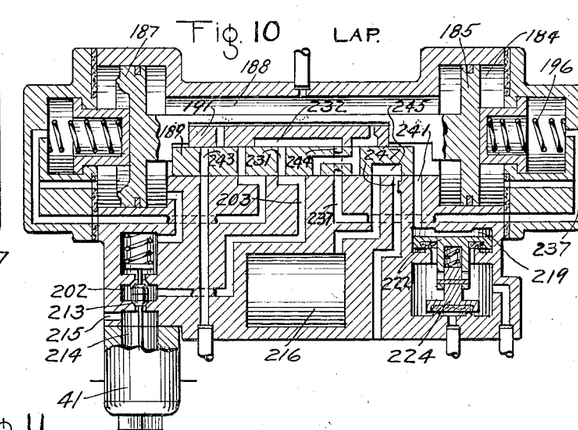

With the brake switch device 18 in the service-lap position, the magnet valve device 41 is de-energized and the valve 201 is forced into engagement with the valve seat 213 by the spring 212. With the valve seat 213 closed, fluid under pressure flows from the valve chamber 188 to the chamber 186 at the left face of the piston 187 through passage 211, chamber 209, past the open valve seat 208, chamber 202, passage 203, port 231 in the main slide valve 189, cavity 232 in the graduating slide valve 191, port 233 in the main slide valve, and passage 234, and when the pressures in the chambers 186 and 184 equalize, the spring 198 will move the stop member 197 and the pistons 187 and 185 and the graduating valve 191 to lap position, as shown in Fig. 10.

With the parts of the electrical triple valve device in lap position, fluid under pressure is supplied from the valve chamber 188 to the chamber 219 through the passage 241 and the fluid under pressure acting on the upper face of the piston 222 retains the exhaust closing valve 224 in closed position. With the graduating valve in the lap position, shown in Fig. 10, the port 243 in the slide valve 189 is lapped and communication from the valve chamber 188 to the brake cylinder is cut off. The brakes are, therefore, retained applied so long as the brake switch remains in service-lap position.

With the electrical triple valve parts in lap position, the main slide valve 189 occupies the same position as it did when the parts were in service position. Therefore, the volume reservoir remains connected to atmosphere through the cavity 245 in the main slide valve.

Figure 11:
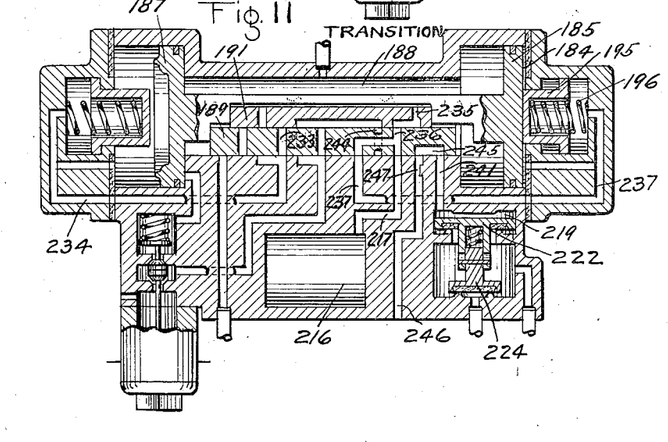

If there is less than a full brake application and it is desired to increase the brake cylinder pressure, the electrical brake switch is moved from service-lap position to service position, where it is again retained for a predetermined period of time by the forked rod 93 controlled by the magnet valve device 19. With the brake switch device 18 in service position, the magnet valve device 41 is again energized and causes the valve 201 to move into engagement with the valve seat 208 and to open the valve seat 213 so that fluid may flow from the piston chamber 184 to the atmosphere through passage 237, port 244 in the main slide valve 189, cavity 232 in the graduating slide valve 191, port 231 in the main slide valve, passage 203, chamber 202, past the open valve seat 213, chamber 214 and atmospheric passage 215, thereby reducing the pressure in the chamber 184. The pressures on the outer faces of the pistons 185 and 187 are unbalanced and the higher fluid pressure acting on the outer face of the piston 187 causes the piston to move toward transition position, as shown in Fig. 11, to which position the valves must be moved in order that the pressure on the left face of the piston 187 may again be reduced to obtain movement of the valves to service position, as will hereinafter appear. As the slide valve 189 is moved to the right, the port 244 in the main slide valve 189 is moved out of registry with the passage 237, thereby cutting off communication from the piston chamber 184 to the atmosphere. However, communication is established from the piston chamber 184 to the then exhausted volume reservoir 216 when the slide valve 189 has moved to the right sufficiently to cause the port 236 in the main slide valve to connect the passages 237 and 217. As the fluid in the volume reservoir is at this time at atmospheric pressure, sufficient fluid may flow from the chamber 184 into the volume reservoir to sufficiently reduce the fluid pressure therein below that within the chamber 186, that the fluid under higher pressure acting on the left face of the piston 187 may force the piston and the valves 189 and 191 into the transition position shown in Fig. 11. The restricted port 235 in the graduating valve 191 then registers with the port 236 in the main slide valve 189 and fluid under pressure flows from the valve chamber 188 to the piston chamber 184 through the restricted port 235 in the graduating slide valve 191, port 236 in the main slide valve 189, and passage 237 until the pressures within the valve chamber 188, volume reservoir 216, and the piston chamber 184 equalize. The spring 196 then forces the stop member 195, the pistons 185 and 187, and the graduating slide valve back to the release position, as shown in Fig. 8, the main slide valve 189 remaining in the same position relative to its seat for the release position as for the transition position.

With the brake switch device 18 still held in service position, the train wires 11 and 12 and the electro-magnet valve device 41 remain energized, so that the valve 201 is held upon the valve seat 208 and the valve seat 213 is open. With the valve seat 213 open, fluid under pressure flows from the piston chamber 186 at the left of piston 187, through passage 234, port 233 in the main slide valve 189, cavity 232 in the graduating slide valve 191, port 231 in the main slide valve, passage 203, past the open valve seat 213, chamber 214 and atmospheric passage 215 to the atmosphere. Because of the reduction in pressure in the chamber 186 and the greater pressure of the fluid in the piston chamber 184 acting on the outer face of piston 185, the pistons 185 and 187 are moved to the left to service position, as shown in Fig. 9, wherein the ports 242 and 243 in the graduating valve and main slide valve, respectively, are in registry with one another and with the passage 37 which leads to the brake cylinder in the manner previously described. Fluid under pressure is thus supplied to the brake cylinder and a second service application of the brakes is effected.

During the time when the pistons 185 and 187 and valves 189 and 191 were momentarily in transition position, shown in Fig. 11, cavity 245 in the main slide valve connected passages 241 and atmospheric passage 246 having a restricted passage 247. The passage 246 being restricted prevented rapid flow of fluid under pressure from the chamber 219 at the upper side of the exhaust closing valve piston 222, so that the fluid pressure in the chamber 219 was not reduced sufficiently during the brief time that the valves were in transition position, to permit opening movement of the valve piston 222 and exhaust closing valve 224. Accordingly, the exhaust closing valve 224 does not open while the pistons 185 and 187 and the graduating and main slide valves are moved from lap position, shown in Fig. 10, to service position, as shown in Fig. 9, through the transition position, shown in Fig. 11.

The purpose of the forked locking rod 93 for the shaft 53 of brake switch handle 56 should now be apparent. Obviously if the brake switch handle 56 were moved from service position to service-lap position to effect deenergization of the electromagnetic valve device 41 at substantially the time that the slide valves of the electrical triple valve device reached release position, no further movement of the slide valves would occur and the brakes would be released. Thus an undesired release of the brakes would be effected by movement of the brake switch handle from service-lap position to service position and back to service-lap position. The locking mechanism, including the forked rod 93, thus insures a service application of the brakes being effected before movement of the brake switch handle to service-lap position can be effected, in order to prevent an undesired release of the brakes by operation of the brake switch device 18.

After sufficient brake cylinder pressure has been obtained by reason of the second service application, the brake switch handle 56 may be returned to lap position, which operation causes deenergization of the magnet valve device 41 and a resulting movement of the pistons 185 and 187 to the service or release lap position, shown in Fig. 10, in the manner previously described.

In making a graduated service application of the brakes, as when fluid under pressure is applied to the brake cylinders after the electrical triple valve device has moved to lap position, as has been previously pointed out, the electrical triple valve piston must move from lap position, as shown in Fig. 10, to transition position and then through release position to service position, as shown in Fig. 9. This operation requires a short time interval for its completion, and it would be undesirable to permit movement of the brake switch handle from service position and consequent deenergization of the magnet valve device 41, until after the operation has been completed. In order to prevent movement of the operating handle from service position to lap or release position before the pistons and slide valves have completed their cycle of movement as described, the locking mechanism, including the forked rod 93 and its controlling electromagnet valve device 19 are provided, which devices operate to retain the electrical brake switch device in service position for a predetermined time, in the manner previously described, upon movement of the brake switch operating handle 56 to service position.

With the electrical triple valve device in lap position, to which position it has just been moved after the second graduated service operation, and it is desired to release the brakes, the operating handle 56 of the brake switch device is moved to release position, thereby causing energization of the train conductors 11 and 12 and the magnet valve device 41, in the manner previously described. As in making a service application, the pistons and valves of the electrical triple valve device move first to transition position before moving to release position, as shown in Fig. 8. The energization of the magnet valve device 41 by operation of the handle 56 of the brake switch device 18 to release position, closes the valve seat 208 and opens the valve seat 213, thereby venting the chamber 184 at the right face of the piston 185 to the atmosphere past the open valve seat 213 in the manner previously described. The pistons 185 and 187, by reason of the higher pressure acting on the left face of the piston 187 in the chamber 186, are forced toward the transition position, as shown in Fig. 11, and subsequently returned to the release position, shown in Fig. 8, by the spring 196, when the pressures of the outer faces of the pistons 185 and 187 within the chambers 184 and 186, respectively, are balanced as in the manner previously described.

With the operating handle 56 of the brake switch device 18 held in release position, the magnet valve 41 is automatically deenergized by the opening operation of the relay 145, which opening operation occurs some time after the slide valves have reached transition position and before they reach release position, and thus since the valve 201 seats on valve seat 213, no venting of the piston chamber 186 occurs when the slide valves reach release position, such as occurs when the brake switch handle 56 is moved to and held in service position. Consequently the slide valves remain in release position, as shown in Fig. 8, and as a result, fluid under pressure from chamber 219 above the exhaust valve piston 222 exhausts to atmosphere by way of passage 241, cavity 245 in the main slide valve 189, restricted passage 247, and passage 246. Upon a sufficient reduction in the fluid under pressure acting in chamber 219 on valve piston 222, brake cylinder pressure acting on the inner seated area of exhaust valve 224 unseats the valve 224 and at the same time, through spring 227, causes upward unseating movement of valve piston 224 from the annular rib seat 223. Fluid under pressure from the brake cylinder 33 thus exhausts to atmosphere through pipes 34, 37, and 229, past valve seat 228 and valve 224 into valve chamber 221, and thence through passage and pipe 39 and the retaining valve device 38, and as a result the brakes are released.

If the brake switch handle 56 is held in release position or moved to release-lap position after the electrical triple valve device has moved to release position, the fluid under pressure in the brake cylinder is fully exhausted to atmosphere and the brakes fully released.

It will be observed that the exhaust valve piston 222 and the exhaust valve 224 are held in open position, as shown in Fig. 8, by the friction of the piston on the casing wall of chamber 219, in the release position of the electrical triple valve device. It will also be observed that the length of the time which elapses, from the instant relay switch device 145 is energized to the instant the relay switch device opens to deenergize magnet valve device 41, is some value between that required for the electrical triple valve device to move from lap position to transition position and that required for the electrical triple valve device to move from the lap position thereof, through transition position, to release position.

If it is desired to secure a graduated release of the brakes, the brake switch handle 56 is held in release position long enough to secure the desired reduction in brake cylinder pressure, after which the brake switch handle 56 is moved to service position and, immediately upon being released by the forked rod 93, to lap position. Movement of the slide valve mechanism of the electric triple valve device to service position is effected upon the energization of magnet valve device 41 in response to movement of the brake switch handle 56 to service position, as previously described for a service application, and upon deenergization of the magnet valve device 41 as a result of movement of the brake switch handle to lap position, the slide valves are moved to lap position. Since the brake switch handle is moved to lap position immediately after being released by the forked rod 93, there is no substantial increase in brake cylinder pressure as a result of fluid under pressure from the slide valve chamber 188 being momentarily supplied to the brake cylinder 33.

In the service and lap positions of the electrical triple valve device 35, fluid under pressure from slide valve chamber 188 is again supplied through passage 241 to chamber 219 above the valve piston 222 and the valve piston 222 and valve 224 are thus returned to seated relation on their respective valve seats to cut off the further exhaust of fluid under pressure from the brake cylinder.

In order to effect a still further release of the brakes, the brake switch handle 56 is again moved from service-lap position to release position and held there long enough to secure the desired reduction in brake cylinder pressure. Movement of the electrical triple valve device to lap position to cut off further exhaust of fluid under pressure from the brake cylinder is then effected, as before, by movement of the brake switch handle 56 to service position, and, immediately upon release of the handle by forked rod 93, to lap position.

Successive movements of the brake switch handle 56, as above described, may be repeated until the brake cylinder has been completely vented and the brakes thereby fully released. The brake switch handle 56 may then be allowed to remain in release position or moved to release-lap position without any effect. Thus, if while the electric triple valve remains in release position, and the brakes are fully released, which is the condition of the brakes when the train is running normally along the road, the brake switch handle 56 is moved directly to lap position without first being moved through service position, the brake switch device 18 is said to be in running-lap or release-lap position, as distinguished from a service-lap position thereof wherein the electrical triple valve is in lap position.

It will be seen, therefore, that the interlocking mechanism comprising dog member 159 and collar 155 is provided for the purpose of preventing and functions only to prevent movement of the brake switch device 18 to release position thereof from running-lap or release-lap position thereof, without first being moved through service position, it being adapted, however, to permit movement of the brake switch device 18 from service-lap position thereof directly to release position thereof without first being moved through service position.

Obviously, if the brake switch device 18 were permitted to be moved directly to release position from release-lap position, without first being moved to service position and back through service-lap position, a service application of the brakes would be effected, because the electromagnetic valve device 41 would be energized by the closing of the switch contact members of brake switch device 18 while in release position, the same as if the brake switch device 18 had been moved to service position, and the electrical triple valve device would be actuated to effect a service application of the brakes. The duration and the extent of the service application would be determined and limited by the time interval required for relay switch device 145 to open its contact members and deenergize the electromagnetic valve device 41 to effect movement of the electrical triple valve device 35 to service-lap position. Thus, an undesired service application might be effected by operation of the brake switch device 18 to release position from release-lap position, except for the provision of the interlocking mechanism above described.

Summarizing, the train equipment includes an electrical triple valve device that may be electrically controlled by timed impulses of electrical current supplied to a magnet valve device for effecting service application of the brakes, release of the brakes, graduated service application of the brakes, graduated release of the brakes, and a lap condition of the brakes.

A brake switch device is provided for controlling the operation of the electrical triple valve device through the magnet valve device, the switch device being movable to three operative positions, namely, release, lap, and service position. If the brake switch device is moved to lap position from release position, it is said to be in release-lap position, and if it is moved to lap position from service position, it is said to be in service-lap position. When the brake switch device is in lap position, the magnet valve device on the electrical triple valve device is deenergized and when the brake switch device is in service position, a circuit through the electro-magnet valve device on the electrical triple valve device is energized and a magnet valve device is also energized for operating an electrically controlled interlocking mechanism on the brake switch device for retaining the brake switch device in service position and consequently the circuit through the magnet valve device on the electrical triple valve device closed for a predetermined time after the operating handle has been moved to the service position. When the brake switch device is in release position, the controlling magnet valve device for the electrical triple valve device is held energized for a predetermined time by a delayed action relay switch device and then deenergized thereby.

The electrical triple valve device is provided with fluid actuated, normally balanced pistons for operating the main and graduating slide valves to release, lap, and service positions, and the fluid under pressure for actuating said pistons is controlled by the said magnet valve device and said valves. The magnet valve device is movable to one operative position when energized and to another position when deenergized. The fluid under pressure acting on the said pistons is thus controlled to effect proper movement of the pistons and associated slide valves to said operative positions as desired.

The nature of the electrical triple valve device is such, that when the operating handle of the brake valve device is moved to service position, the controlling magnet valve device is energized and causes the valve to move to service position, in which position fluid under pressure is caused to flow from the auxiliary reservoir to the brake cylinder to effect an application of the brakes and the exhaust passage from the brake cylinder to the atmosphere is closed.

When the brake switch handle is moved to service-lap position, the magnet valve device is deenergized and the slide valves are moved by the pistons to lap position in response to a change in pressure on the pistons occasioned by the shift in position of the magnet valve device.

In effecting a reapplication of the brakes from a service-lap position of the brake switch device, the brake switch device is moved to service position where it is maintained at least a predetermined time, movement of the electrical triple valve device being effected in such manner that it moves from service-lap position through a transition position and through release position to service position, the extent or degree of the reapplication being determined by the length of time the brake switch handle is retained in service position before being returned to service-lap position. The interlocking mechanism, above referred to, functions to prevent an undesired release of the brakes by operation of the brake switch device to service position from service-lap position by holding the brake switch handle in service position a sufficient length of time to insure its movement through transition position and past release position. If return movement of the brake switch device to service-lap position were permitted prior to the electrical triple valve device reaching service position, as for example, while it were yet in release position, and undesired release of the brakes would be effected.

To effect a release of the brakes from a service-lap position of the electrical triple valve device and of the brake switch device, the brake switch device is moved directly to release position. The electrical triple valve device is accordingly operated, upon energization of its controlling magnet valve device, to move through transition position to release position where it stops because of the deenergization of the controlling magnet valve device by the opening of the delayed action relay switch device.

Exhaust of fluid under pressure from the brake cylinder, as long as the brake switch device is held in release position, is thus effected. If a full release of the brakes is desired, the brake switch is maintained in release position until the brake cylinder is completely vented.

If a graduated release of the brakes is desired, the brake switch device is moved to release position from service-lap position, as above described, held there long enough to secure the desired reduction in brake cylinder pressure, and then moved to service position, whence after being released by the locking mechanism above described, it is returned to service-lap position.

Repeated operations of the brake switch device to release position from service-lap position and back to service-lap position through service position, may be effected until complete release of the brakes is attained.

In order to prevent an undesired service application of the brakes by movement of the brake switch device to release position thereof from release-lap position thereof, wherein the electrical triple valve device is in release position, a locking mechanism is provided, comprising a togglebiased dog member which cooperates with a notched collar secured to the operating shaft of the brake switch device. This locking mechanism prevents movement of the brake switch device from release-lap position to release position without first being moved through service position, it being adapted to permit movement of the brake switch device from release-lap position to service position for freeing the brake switch device to move thereafter to release position.

The apparatus above described is capable of effecting, by proper manipulation of the brake switch device, service, graduated service, release, and graduated release operations of the brakes and the brakes may be held at will in lap position, and by reason of the improved brake switch device and electrical triple valve device, the triple valve device may be controlled by a single magnet valve device energized by current supplied through a two wire or conductor circuit.

While I have disclosed but one embodiment of the invention, it is apparent that omissions, additions and other changes may be made in the apparatus without departing from the spirit of the invention.

Having now described my invention, what I claim as new and desire to secure by Letters Patent, is:

1. The combination with a fluid operated brake means, of a fluid actuated valve device for controlling the fluid supply to said brake means and having an operating cycle having two or more operative positions for effecting a corresponding predetermined cycle of operating conditions in said brake means and operative to predetermined operative positions in response to timed supplies of actuating fluid supplied thereto, current responsive means for controlling the supply of actuating fluid to said valve device, a manually actuated current controlling means for controlling the current supplied to said current responsive means, and time controlled means for governing the operation of the manually actuated current controlling means.

2. The combination with a fluid operated brake means, of a fluid actuated valve device for controlling the fluid supply to said brake means and having an operating cycle having two or more operative positions for effecting a corresponding predetermined cycle of operating conditions in said brake means and operative to predetermined operative positions in response to timed supplies of actuating fluid supplied thereto, current responsive means for controlling the supply of actuating fluid to said valve device, a manually operated means for controlling the current supplied to said current responsive means adapted to close a circuit through said current responsive means when in one of its operative positions, and means for retaining the said manually operated means in said operative position for a predetermined time after it has moved to said position.

3. The combination with a fluid operated brake means, of a fluid actuated valve device for controlling the fluid supply to said brake means and having an operating cycle having two or more operative positions for effecting a corresponding predetermined cycle of operating conditions in said brake means and operative to predetermined operative positions in response to timed supplies of actuating fluid supplied thereto, current responsive means for controlling the supply of actuating fluid to said valve device, a manually operated means for controlling the current supplied to said current responsive means adapted to close a circuit through said current responsive means when in one of its operative positions, and means for automatically opening the circuit through said current responsive means a predetermined time after said manually operable means has moved to said position.

4. The combination with a fluid operated brake means, of a fluid actuated valve device for controlling the fluid supply to said brake means and having an operating cycle having two or more operative positions for effecting a corresponding predetermined cycle of operating conditions in said brake means and operative to predetermined operative positions in response to timed supplies of actuating fluid supplied thereto, current responsive means for controlling the supply of actuating fluid to said valve device, a manually operable means for controlling the current supplied to said current responsive means having three operative positions, in two of which the circuit through the current responsive means is closed and in the other of which said circuit is open, means for retaining said manually operable means in one of its said two circuit-closed positions for a predetermined time after the manually operable means has moved to that position, and means for automatically opening the circuit through said current responsive means a predetermined time after the manually operated means has moved to the other of its said two circuit-closed positions.

5. The combination with a fluid operated brake means, of a fluid actuated valve device for controlling the fluid supply to said brake means and having an operating cycle having two or more operative positions for effecting a corresponding predetermined cycle of operating conditions in said brake means and operative to predetermined operative positions in response to timed supplies of actuating fluid supplied thereto, current responsive means for controlling the supply of actuating fluid to said valve device, a manually operable means for controlling the current supplied to said current responsive means having three operative positions, in two of which the circuit through the current responsive means is closed and in the other of which said circuit is open, means for retaining said manually operable means in one of its said two circuit-closed positions for a predetermined time after the manually operable means has moved to that position, means for automatically opening the circuit through said current responsive means a predetermined time after the manually operated means has moved to the other of its said two circuit-closed positions, and means cooperating with said manually operated means for preventing movement thereof from said circuit open position to the second circuit-closed position unless said manually operated means has been moved to said circuit-open position from said first circuit-closed position.

6. In a fluid operated brake means, the combination with a fluid operated valve device for controlling the fluid supply to the brake means and having an operating cycle having more than two operative positions for effecting a predetermined cycle of operating conditions in the brake means, of a valve means for controlling said valve device and reciprocable between two operative positions, and means whereby repeated movement of the valve means alternately to its operative positions effects movement of the pneumatically operated valve device successively to its operative positions in the operating cycle thereof.

7. In an electrically controlled fluid operated brake means, the combination with a fluid operated valve device for controlling the fluid supply to the brake means and having an operating cycle having more than two operative positions for effecting a predetermined cycle of operative conditions in the brake means, of an electrically controlled valve means for controlling said valve device and reciprocable between two operative positions, and means whereby repeated movement of the electrically controlled valve means alternately to its operative positions effects movement of the pneumatically operated valve device successively to its operative positions in the operating cycle thereof.

8. In a fluid operated brake means, the combination with a fluid operated valve device for controlling the fluid supply to the brake means and having an operating cycle having more than two operative positions for effecting a predetermined cycle of operating conditions in the brake means, of a valve means for controlling said valve device and reciprocable between two operative positions, means whereby repeated movement of the valve means alternately to its operative positions effects movement of the pneumatically operated valve device successively to its operative positions in the operating cycle thereof, and a manually actuated automatically operated control means for effecting a movement of the valve means from one operative position to its other operative position a predetermined time after the control means has been actuated manually.

9. In a fluid operated brake means, the combination with a fluid operated valve device for controlling the fluid supply to the brake means and having an operating cycle having more than two operative positions for effecting a predetermined cycle of operating conditions in the brake means, of a valve means for controlling said valve device and reciprocable between two operative positions, means whereby repeated movement of the valve means alternately to its operative positions effects movement of the pneumatically operated valve device successively to its operative positions in the operating cycle thereof, manually actuated control means for the valve means for effecting the movement of the valve means from one operative position to its other operative position, and means automatically actuated a predetermined time after movement of the manually actuated control means for effecting the movement of the valve means from said other operative position to the said one operative position.

10. In a fluid operated brake means, the combination with a fluid operated valve device for controlling the fluid supply to the brake means and having an operating cycle comprising a plurality of distinct operative positions for effecting a predetermined cycle of operating conditions in the brake means, of a valve means for controlling said valve device and reciprocable between two operating positions for effecting the operation of the said valve device successively to its operative positions in its operating cycle, and a controlling means for said valve means adapted to automatically effect an operation of the said valve means a predetermined time after it has effected an operation of the said valve means.

11. In a fluid operated brake means, the combination with a fluid operated valve device for controlling the fluid supply to the brake means and having an operating cycle comprising a plurality of distinct operative positions for effecting a predetermined cycle of operating conditions in the brake means, of a valve means for controlling said valve device and reciprocable between two operating positions for effecting the operation of the said valve device successively to its operative positions in its operating cycle, and a manually and automatically actuated control means for said valve means adapted to be automatically actuated to effect an operation of the said valve means a predetermined time after it has effected an operation of the said valve means by a manual actuation.

12. In a fluid operated brake means, the combination with a fluid operated valve device for controlling the fluid supply to the brake means and for effecting different operating conditions in said brake means when moved to different operating positions, of a valve means for controlling the delivery of fluid to the said valve device for effecting a successive movement of the said valve device from one position to another of its several operative positions upon each movement of said valve means, control means for moving the valve means to its respective operating positions, and means for controlling operation of the said control means for automatically regulating the time interval between successive movements of said valve means.

13. In a fluid operated brake means, the combination with a fluid operated valve device for controlling the fluid supply to said brake means, for effecting different operating conditions in said brake means when moved to different operating positions and a valve means for controlling the fluid under pressure acting on said valve device for effecting step by step movement of said valve device to its respective operative positions upon movements of said valve means to its respective operating positions, means for moving said valve means to its operative positions, and means for controlling the last said means and for automatically regulating the time interval between successive movements of said valve means.

14. A valve device for controlling a fluid actuated brake means supplied with actuating fluid from a source of supply of fluid under pressure, comprising a fluid actuated valve means for controlling the delivery of fluid from the said supply to the said brake means and movable through a predetermined cycle of operations to effect a cycle of more than two operating conditions in the brake means, and a single valve device having two operative positions and cooperating with the said valve means for effecting a cycle of operation of the valve means when repeatedly moved alternately to its respective operating positions.

15. A valve device for controlling a fluid actuated brake means supplied with actuating fluid from a source of supply of fluid under pressure, comprising a fluid actuated valve means for controlling the delivery of fluid from the said supply to the said brake means and movable through a predetermined cycle of operations to effect a cycle of more than two operating conditions in the brake means, a single valve device having two operative positions and cooperating with the said valve means for effecting a cycle of operation of the valve means when repeatedly moved alternately to its respective operating positions, and means for controlling the operation of the single valve device.

16. A valve device for controlling a fluid actuated brake means supplied with actuating fluid from a source of supply of fluid under pressure, comprising a fluid actuated valve means for controlling the delivery of fluid from the said supply to the said brake means and movable through a predetermined cycle of operations to effect a cycle of more than two operating conditions in the brake means, a single valve device having two operative positions and cooperating with the said valve means for effecting a cycle of operation of the valve means when repeatedly moved alternately to its respective operating positions, and current responsive means for controlling the operation of the single valve device.

17. A valve device for controlling a fluid actuated brake means supplied with actuating fluid from a source of supply of fluid under pressure, comprising a fluid actuated valve means for controlling the delivery of fluid from the said supply to the said brake means and movable through a predetermined cycle of operations to effect a cycle of more than two operating conditions in the brake means, a single valve device having two operative positions and cooperating with the said valve means for effecting a cycle of operation of the valve means when repeatedly moved alternately to its respective operating positions, and current responsive automatically controlled means for effecting operations of the single valve device in timed relation.

18. A valve device for controlling the operation of a fluid actuated brake means having service, lap, and release operating conditions constituting a cycle of brake operation, comprising a fluid pressure actuated valve device movable to service, lap, and release positions for respectively effecting the said operating conditions of the said brake means, a valve means having two operative positions for controlling the fluid acting on said valve device to effect movement of the said valve device, and means including means controlled by the said valve device and the said valve means for effecting movement of the said valve device to its respective operative positions successively upon each change in pressure occasioned by the alternate movement of the said valve means to its said operative positions.

19. In a brake controlling apparatus, in combination, brake controlling means operably responsive to electrical impulses for controlling the brakes, means manually operative to a position for effecting the imposition of electrical impulses on the brake controlling means, and means, effective upon operation of said manually operative means to said position, for resisting operation of the manually operative means out of the said position for a certain uniform length of time.

20. In a brake controlling apparatus, in combination, brake controlling means operably responsive to electrical impulses for controlling the brakes, means manually operative to a position for effecting the imposition of electrical impulses on the brake controlling means, and means, effective upon operation of said manually operative means to said position, for resisting operation of the manually operative means out of the said position and, upon the elapse of a certain uniform length of time, to be ineffective to resist operation of the manually operative means out of the said position.

21. In a brake controlling apparatus, in combination, brake controlling means operably responsive to electrical impulses for controlling the brakes, means manually operative to a position for effecting the imposition of electrical impulses on the brake controlling means, means, effective upon operation of said manually operative means to said position, for resisting operation of the manually operative means out of the said position, and means, controlling said resisting means, for rendering it ineffective to resist operation of the manually operative means out of the said position upon the elapse of a certain uniform length of time.

22. In a brake controlling apparatus, the combination with a brake controlling valve device responsive to timed electrical impulses for controlling the brakes, of manually operated means for imposing electrical impulses on said valve device, and current responsive means for timing the operation of said manually operated means.

23. In a brake controlling apparatus, the combination with a brake controlling valve device responsive to timed electrical impulses for controlling the brakes, of manually operated means for imposing electrical impulses on said valve device, and current responsive means for controlling the operation of said manually operated means for insuring timed operation of said manually operated means.

24. The combination with a fluid operated brake means, of a valve device for controlling the fluid supply to said brake means and having an operating cycle having two or more operative positions for effecting a corresponding predetermined cycle of operating conditions in the brake means, a current responsive control means for said valve device for effecting movement thereof to predetermined operative positions in response to timed electrical current impulses, manually actuated means for imposing electrical impulses on said current responsive control means, and time controlled means for governing the operation of said manually actuated means.

25. The combination with a fluid operated brake means, of a fluid actuated valve device for controlling the fluid supply to said brake means and having an operating cycle having more than two operative positions for effecting a corresponding predetermined cycle of operating conditions in the brake means, a current responsive control means for controlling the supply of fluid to said valve device for effecting movement thereof to predetermined operative positions in response to timed electrical current impulses, manually actuated means for imposing electrical impulses on said current responsive control means, and time controlled means for governing the operation of said manually actuated means.

26. In a brake apparatus, the combination with a brake controlling means operatively responsive to electrical impulses for controlling the brakes, of manually operable means operable to a position for effecting the imposition of an electrical impulse on said brake controlling means, and means, effective when said manually operable means is operated to said position, to prevent movement of said manually operable means out of said position until after the expiration of a predetermined time.

27. In a brake apparatus, the combination with a brake controlling means operatively responsive to electrical impulses for controlling the brakes, of manually operable means operable to a position for effecting the imposition of an electrical impulse on said brake controlling means, locking means operative when said manually operable means is operated to said position to prevent movement of said manually operable means out of said position, and means effective a predetermined time after said manually operable means is moved to said position for rendering said locking means ineffective to prevent movement of said manually operable means out of said position.

28. In a brake apparatus, the combination with a brake controlling means operatively responsive to electrical impulses for controlling the brakes, of manually operable means operable to a position for effecting the imposition of an electrical impulse on said brake controlling means, and means, effective a predetermined time after said manually operable means is operated to said position, to interrupt the electrical impulse.

29. In a brake apparatus, the combination with a brake controlling means operatively responsive to electrical impulses for controlling the brakes, of manually operable means operable to two different positions for effecting the imposition of electrical impulses on said brake controlling means, means effective when said manually operable means is operated to one of the said two positions, to prevent movement of said manually operable means out of said position until after the expiration of a predetermined time, and means effective a predetermined time after said manually operable means is operated to the other of the said two positions to interrupt the electrical impulse.

30. In an electropneumatic brake, in combination, a brake controlling valve device, electrically controlled means for effecting the operation of said valve device, manually controlled means movable to two positions for controlling the circuit of said electrically controlled means and having an intermediate lap position, and means for preventing movement of said manually controlled means from lap position to one of said two circuit controlling positions immediately following movement of said manually controlled means from said one circuit controlling position to the lap position.

31. In an electropneumatic brake, in combination, a brake controlling valve device, electrically controlled means for effecting the operation of said valve device, manually controlled means movable to a release position and to a brake application position for controlling said electrically controlled means and having an intermediate lap position, and means for preventing movement of said manually controlled means from lap position to said release position, immediately following movement of said manually controlled means from release position to lap position.

32. In an electropneumatic brake, in combination, a brake controlling valve device, electroresponsive means adapted when energized to effect operation of said brake controlling valve device, manually operable means movable from an intermediate position in which said electroresponsive means is deenergized into two opposite positions for effecting energization of said electroresponsive means, and means for preventing movement of said manually operable means from said intermediate position to one of said two positions, immediately following movement of said manually operable means from said one of the two positions to said intermediate position.

33. In an electropneumatic brake, in combination, a brake controlling valve device, electroresponsive means adapted when energized to effect operation of said brake controlling valve device, manually operable means movable from an intermediate position in which said electroresponsive means is deenergized into two opposite positions for effecting energization of said electroresponsive means, and means for preventing movement of said manually operable means from said intermediate position to one of said two positions, immediately following movement of said manually operable means from said one of the two positions to said intermediate position, unless said manually operable means is first moved to the other of said two positions.

34. In a fluid pressure brake, valve means having a plurality of different positions for controlling the operation of the brakes, pressure responsive means for moving the valve means, said pressure responsive means being normally subject to opposing fluid pressures tending to urge the pressure responsive means in opposite directions and movable responsive to variations in the fluid pressures to move the said valve means, and means operative, when the said valve means is in one position, to vary one of the fluid pressures acting on the pressure responsive means, and operative, when the said valve means is in another position, to vary the other of the fluid pressures acting on the pressure responsive means.

35. In a fluid pressure brake, valve means having a plurality of different positions for controlling the operation of the brakes, pressure responsive means for moving the valve means, said pressure responsive means being normally subject to opposing fluid pressures tending to urge the pressure responsive means in opposite directions and movable responsive to variations in the fluid pressures to move the said valve means, means operative at one time to vary one of the fluid pressures acting on the pressure responsive means and at another time to vary the other of the fluid pressures acting on the pressure responsive means, and means conditioned according to the position of said valve means for determining which of the fluid pressures will be varied by operation of the said last means.

36. In a fluid pressure brake, valve means having a plurality of different positions for controlling the operation of the brakes, pressure responsive means for moving the valve means, said pressure responsive means being normally subject to opposing fluid pressures tending to urge the pressure responsive means in opposite directions and movable responsive to variations in the fluid pressures to move the said valve means, and means operative at one time to vary one of the fluid pressures acting on the pressure responsive means and at another time to vary the other of the fluid pressures acting on the pressure responsive means, said valve means being effective in one position thereof to cause the operation of the said last means to vary the said one fluid pressure acting on the pressure responsive means and effective in another position thereof to cause the operation of the said last means to vary the said other of the fluid pressures acting on the pressure responsive means.

JOSEPH C. McCUNE.